J. BECKER.
LINKAGE.
APPLICATION FILED MAR. 13, 1915.

1,190,215.

Patented July 4, 1916.

Witnesses
Mary L. Cowell
W. T. Howard Jr.

Inventor
Joseph Becker

UNITED STATES PATENT OFFICE.

JOSEPH BECKER, OF WASHINGTON, DISTRICT OF COLUMBIA.

LINKAGE.

1,190,215.  Specification of Letters Patent.  Patented July 4, 1916.

Original application filed June 17, 1913, Serial No. 774,220. Divided and this application filed March 13, 1915. Serial No. 14,178.

*To all whom it may concern:*

Be it known that I, JOSEPH BECKER, a citizen of the United States, residing at Washington, in the District of Columbia, have invented certain new and useful Improvements in Linkages, of which the following is a specification.

The present application identified for convenience of cross reference as Case Ad is a division of my prior application, Case Aa, now Patent 1,136,761, issued April 20, 1915, being drawn to the separably patentable constant product linkage of such Case Aa.

My invention, therefore, consists generally in the pantographic combination of two unequal but similar Peaucellier cells and it consists specifically in a specially useful and greatly simplified form of such combination.

Figure 1:
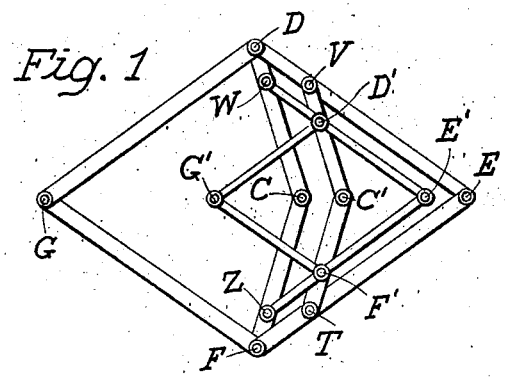
Figure 4:
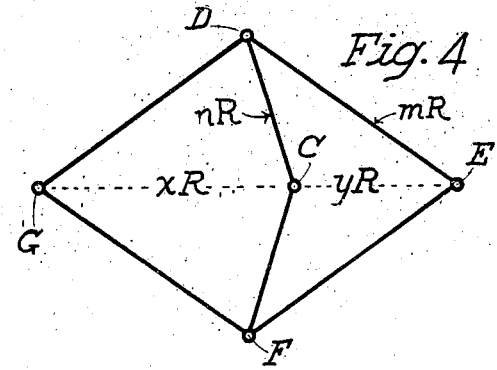
Figure 2:
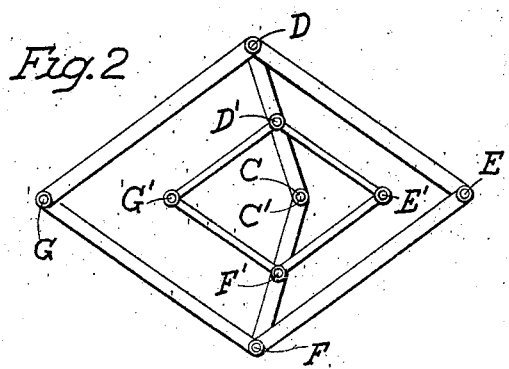
Figure 5:
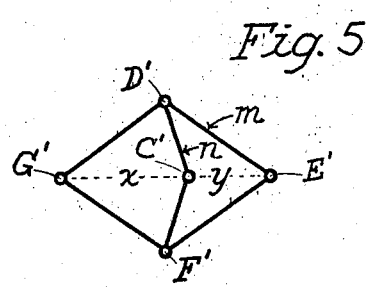
Figure 3:
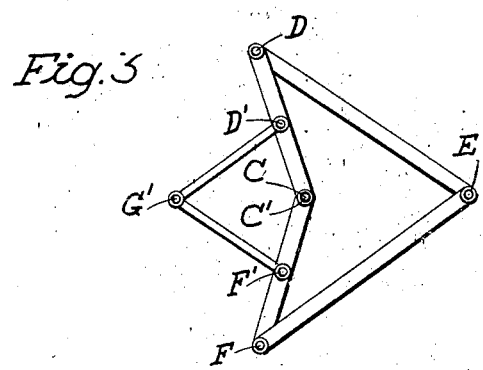
Figure 6:
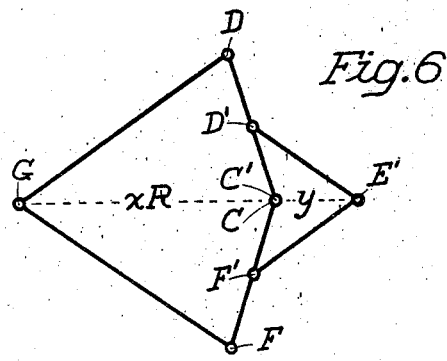

In the accompanying drawings: Figure 1 shows the invention in its most general form, as it must be made to meet all possible uses contemplated in my Case Aa. Fig. 2 shows the invention in a simpler form, also useful in Case Aa, but having other useful applications. Fig. 3 shows a still further simplification of Fig. 2. Figs. 4, 5 and 6 are explanatory diagrams.

As well understood, the Peaucellier cell consists in an articulated rhombus DEFG, Fig. 4, having diagonally opposite joints D and F connected by two articulated equal links CD and CF; and this articulated combination or "cell," as it is called, determines two alined co-varying space elements CG and CE that form a constant product $$CG \cdot CE = (DE^2 - DC^2).$$

Now, my invention consists, Fig. 1, in mounting, on such large Peaucellier cell of Fig. 4, a similar smaller Peaucellier cell C'D'E'F'G' in which all dimensions are and remain parallel to the corresponding dimensions of the larger cell; such similarity being maintained by providing pantographic parallelogram connections, such as WV and ZT, to preserve the equality of the corresponding angles in the two cells.

Points C and C' of the two cells may be referred to as the poles, and the interpolar distance CC', is a constant fraction, $\frac{1}{4}$ in Fig. 1, of the distance CE, a result which depends on the pantographic connection and which is of considerable importance in my Case Aa, where the ratio CC'/CE must have a definite value. It must, for instance, be equal to zero when the lenses A and B to be used have focal lengths that are numerically equal, and in this case Fig. 1 assumes the simpler form of Fig. 2.

In Fig. 1, and as more clearly seen in Fig. 2, a constant product is formed by any two of the four different co-varying space elements CG, CE, C'G', and C'E', excepting the pair CG, C'G', and the pair CE, C'E' which form a constant ratio.

Where only two of such space elements are required, as in most uses, the other two and their links may be suppressed. Thus by suppressing CG and C'E' in Fig. 2 we form the constant product linkage of Fig. 3, and by suppressing C'G' and CE in Fig. 2 we form the constant product linkage of Fig. 6, which is a mere reversal of Fig. 3, and is added mainly to show that there is no substantial difference between my linkage and that of the Dutert foreign patents, which are fully cited in Note 3 below.

*Structural proportions.*—If the constant ratio of a dimension such as DE in the large Peaucellier cell, Figs. 1 and 2, to the corresponding dimension D'E' in the small cell be designated by R, then all dimensions involved may conveniently be defined as in the following table:

| Small cell. | Large cell. |
|---|---|
| D'E'=m | DE=mR |
| D'C'=n | DC=nR |
| C'G'=x | CG=xR |
| C'E'=y | CE=yR |

According to the established Peaucellier practice, we have in the small cell, Fig. 5, $$C'G' \cdot C'E' = xy = (m^2 - n^2) \quad (1)$$

which is our first and smallest constant product. With this equation 1 and the aid of the above table the three other products may be written out almost directly as follows:

$$C'G' = x$$
$$CE = yR$$
$$C'G' \cdot CE = xyR = (m^2 - n^2)R \quad (2)$$

then $$CG = xR$$
$$C'E' = y$$
$$CG \cdot C'E' = xyR = (m^2 - n^2)R \quad (3)$$

finally $$CG = xR$$
$$CE = yR$$
$$CG \cdot CE = xyR^2 = (m^2 - n^2)R^2 \quad (4)$$

The four constant products are, therefore:

Product one $\quad C'G' \cdot C'E' = (m^2 - n^2)$
Product two $\quad C'G' \cdot CE = (m^2 - n^2)R$
Product three $\quad CG \cdot C'E' = (m^2 - n^2)R$
Product four $\quad CG \cdot CE = (m^2 - n^2)R^2$ Product one, relating to the small Peaucellier cell, Fig. 5, and product four, relating to the large Peaucellier cell, Fig. 4, are well known and need no further explanation. Product two, relating to Fig. 3, and product three, relating to Fig. 6, are equal. These equal products, product two and product three, contain three different structural constants $m$, $n$ and R, any two of which may be selected arbitrarily when a certain desired constant product is to be obtained.

The linkage chosen for illustration is one in which all values are whole number values, so as to facilitate direct verifications on the drawing, which is to scale. Thus we have: $m$ equal to 25 centimeters; $n$ equal to 15 centimeters; R equal to plus 2; and the 4 constant products are, respectively, 400, 800, 800 and 1600. For clearness the variables $x$ and $y$ are shown throughout all views as $x$ equal to 25 centimeters and $y$ equal to 16 centimeters.

Note 1.—In linkage literature the Peaucellier constant product linkage CDEFG, Fig. 4, is often referred to as consisting of a "kite" CDFG combined with a "spear head" CDFE; the terms being reversed when C is pushed over closer to G. Kempe in his book *How to Draw a Straight Line; a Lecture on Linkages;* London, 1877, uses these terms. My Fig. 3, therefore, may be considered as composed by uniting the "kite" C'D'F'G' of the small Peaucellier cell with the "spear head" CDFE of the large Peaucellier cell; and my Fig. 6, which is simply the linkage of Fig. 3 reversed and shown in a different position, may similarly be considered as composed by uniting the "kite" CDFG of the large Peaucellier cell to the "spear head" C'D'F'E' of the small Peaucellier cell.

Note 2.—I am aware that the combination of a small spear head with a large kite is old in Fig. 26 (4), page 501, of the Phillips and Fisher "*Elements of Geometry*," New York, 1896; also that the same linkage shown as the combination of a large spear head with a small kite is old in Fig. 50 (8) and Fig. 50 (9), page 511, of the same work. In such old Phillips linkage, however, the kite and spear head are united by connecting the sides of their equal angles; whereas, my linkage is formed by connecting the sides of the angles which are opposed to such equal angles, and which unite to form four right angles.

Note 3.—I am aware that Kempe in Fig. 10, page 17, of his book (*How to Draw a Straight Line; a Lecture on Linkages;* London, 1877) shows a later French type of Peaucellier cell consisting of a "large kite" and a "small spear-head," somewhat as in my Fig. 6; but this later French linkage has its lever elements crossed and fulcrumed at the third terminal as polar point of the linkage; whereas, the levers of my Fig. 6, are not crossed, and are fulcrumed at the second terminal as polar point.

Note 4.—I am aware that the combination of a Peaucellier cell element with the corresponding cell element made larger, is old in the *American Machinist*, New York, 1891, vol. 14, in three several places as follows: First, old in Fig. 16, page 4, of the October 29 number, where a small spear-head ADCF is combined with a large kite AGHI to determine the co-varying factors AC and AH of the constant product AC.AH; secondly old, in Fig. 18, page 4, of the same October 29 number, where a small kite ADCF is combined with a larger spear-head EIHG to determine the co-varying factors AC and AH of the constant product AC.AH; thirdly, old, in Fig. 19, page 11, of the December 3 number, where a large kite, AJKI, is combined with a small spear-head, AGCH, to determine the co-varying factors AC and AK of the constant product AC.AK; but, in each of these three different linkages the polar terminal being at A is not the second one of the three terminals as in my Fig. 6.

Note 5.—I am aware that each of the three *American Machinist* linkages referred to in Note 4, really consists of a complete seven-bar Peaucellier straight line linkage pantographically combined with an extra large Peaucellier cell element, which cell element is formed mainly by the addition of two links forming: an extra large kite AGHI in Fig. 16; an extra large spear-head EIHG in Fig. 18; and an extra large kite AJKI in Fig. 19; but not one of these three linkages shows two complete and unequally large Peaucellier cells comprising two kites and two spear-heads as in my Fig. 1 or in my Fig. 2.

NOTE 6.—I am aware that bars CD, DE and D'G' of my Fig. 3 correspond in substance to the 3-bar focusing linkage of Dutert shown: first, presumably in his Belgian patent, filed June 17, 1911; secondly, in his German Patent No. 261,904, filed the day before June 23, 1911; thirdly, in his French Patent No. 444,694, filed June 6, 1912; fourthly, in his British Patent No. 13,879 of 1912, filed June 13, 1912; but my general form of Fig. 1, as well as my simple form of Fig. 2, and my still simpler form of Fig. 3, were all three invented prior to the said earliest claimed Dutert date of June 17, 1911.

What I claim as my invention and desire to secure by Letters Patent is:

1. A constant product linkage comprising a large Peaucellier cell and a similar smaller Peaucellier cell, and connections to keep their corresponding angles equal.

2. A linkage adapted to determine constant product space elements between three terminals guided to move in the same straight path, such linkage comprising a link with one end pivoted to the first terminal, a longer link with one end pivoted to the third terminal and a straight lever having one end fulcrumed on the second terminal, said lever having its longer lever arm connected with the longer of the said two links and its shorter lever arm connected with the shorter of the said two links.

3. A linkage adapted to determine constant product space elements between three terminals guided to move in the same straight path, such linkage comprising a link with one end pivoted to the first terminal, a longer link with one end pivoted to the third terminal and a straight lever having one end fulcrumed to the second terminal, said lever having its longer lever arm connected with the longer of the said two links and its shorter lever arm connected with the shorter of the said two links; said two links and said two lever arms being of such lengths as to form a link ratio that is equal to the corresponding lever arm ratio.

In testimony whereof, I have signed my name to this specification in the presence of two subscribing witnesses.

JOSEPH BECKER.

Witnesses:
  MARY E. COWELL,
  H. P. HOWARD, Jr.